United States Patent
Infanti et al.

(10) Patent No.: US 8,596,805 B2
(45) Date of Patent: Dec. 3, 2013

(54) LIGHT-COLLECTING ACCESSORY FOR AN ELECTRONIC DEVICE

(75) Inventors: James Carl Infanti, Waterloo (CA); Archer Chi Kwong Wun, Maple (CA); William Stephen Steinhoff, Plantation, FL (US)

(73) Assignee: BlackBerry Limited, Waterloo (CA)

( * ) Notice: Subject to any disclaimer, the term of this patent is extended or adjusted under 35 U.S.C. 154(b) by 208 days.

(21) Appl. No.: 13/157,788

(22) Filed: Jun. 10, 2011

(65) Prior Publication Data
US 2012/0314421 A1 Dec. 13, 2012

(51) Int. Cl.
H04M 1/22 (2006.01)
F21V 33/00 (2006.01)
A45C 15/06 (2006.01)

(52) U.S. Cl.
USPC .............................. 362/88; 362/154; 362/156

(58) Field of Classification Search
USPC ........................................... 362/88, 154–156
See application file for complete search history.

(56) References Cited

U.S. PATENT DOCUMENTS

| 5,760,754 | A | 6/1998 | Amero et al. | |
|---|---|---|---|---|
| 6,435,690 | B1 * | 8/2002 | Till | 362/88 |
| 6,600,662 | B1 | 7/2003 | Emmert et al. | |
| 6,980,777 | B2 * | 12/2005 | Shepherd et al. | 455/90.3 |
| 6,983,168 | B2 | 1/2006 | Chen | |
| 7,270,435 | B2 | 9/2007 | Lin | |
| 7,336,980 | B1 | 2/2008 | Kaikuranta et al. | |
| 7,338,193 | B1 | 3/2008 | Zeiger | |
| 7,468,665 | B2 | 12/2008 | Grundy | |
| 7,573,644 | B2 | 8/2009 | Huang | |
| 7,926,981 | B2 * | 4/2011 | Hunt et al. | 362/276 |
| 2003/0210780 | A1 * | 11/2003 | Pratt et al. | 379/428.01 |
| 2005/0231939 | A1 | 10/2005 | McCoy | |
| 2006/0276220 | A1 * | 12/2006 | Schure | 455/550.1 |
| 2007/0041192 | A1 | 2/2007 | Lin | |
| 2007/0159808 | A1 | 7/2007 | Chen | |
| 2009/0096417 | A1 | 4/2009 | Idzik et al. | |
| 2009/0257182 | A1 | 10/2009 | Yang | |
| 2013/0088410 | A1 * | 4/2013 | Hill et al. | 345/1.1 |

FOREIGN PATENT DOCUMENTS

| EP | 1457941 A2 | 9/2004 |
|---|---|---|
| GB | 2381986 A | 5/2003 |
| JP | 2000210113 A | 8/2000 |
| WO | 2011090536 A1 | 7/2011 |

OTHER PUBLICATIONS

Extended European Search Report mailed Apr. 4, 2012. In corresponding application No. 11169607.6.
Light tubes in electronic devices. http://en.wikipedia.org/wiki/Lightpipe. Retrieved on Apr. 13, 2012.

* cited by examiner

Primary Examiner — David J Makiya
(74) Attorney, Agent, or Firm — Novak Druce Connolly Bove + Quigg LLP (57) ABSTRACT

A light-collecting accessory for an electronic device includes a housing having an outer surface and an inner surface. The housing can form an opening adapted to receive the electronic device. A light guide is communicatively coupled to the housing. The light guide can have a first end and a second end. The first end can be communicatively coupled to the outer surface of the housing. The second end can be communicatively coupled to the inner surface of the housing. In the event the electronic device resides in the opening of the housing, light emitted from the electronic device passes from the second end of the light guide to the first end of the light guide.

20 Claims, 5 Drawing Sheets

LIGHT-COLLECTING ACCESSORY FOR AN ELECTRONIC DEVICE

FIELD OF TECHNOLOGY

The present disclosure relates generally to electronic devices. More specifically, the present disclosure relates to accessories for electronic devices.

BACKGROUND

With the advent of more robust electronic systems, advancements of electronic devices are becoming more prevalent. Electronic devices can provide a variety of functions including, for example, telephonic, audio/video, and gaming functions. Electronic devices can include mobile stations such as cellular telephones, smart telephones, portable gaming systems, portable audio and video players, electronic writing or typing tablets, mobile messaging devices, personal digital assistants, and handheld computers. Additionally, as electronic devices advance, so must the accessories that accommodate the electronic devices.

BRIEF DESCRIPTION OF THE DRAWINGS

Implementations of the present application will now be described, by way of example only, with reference to the attached Figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this document will now be presented. The phrase "communicatively coupled" is defined as connected, whether directly or indirectly through intervening components and is not necessarily limited to physical connections. The term "electronic device" is defined as any electronic device that is capable of at least accepting information entries or commands from a user and includes its own power source. The term "light source" is defined as a component adapted to emit light. The term "collect" is defined as concentrating, focusing, directing, and redirecting. For example, collecting light can refer to concentrating or focusing light emitted from a light source or from a first location. Also, collecting light can refer to directing light from one location to another location. Similarly, collecting light can refer to redirecting light from one location to another location.

Electronic devices typically include light sources which are adapted to emit light, such as a flashing light, to provide a visual notification of an incoming message (for example, a telephone call, incoming message, an alarm, or other data and information which can be received by the electronic device). When an electronic device resides in a conventional accessory, the light source is typically obstructed or at least partially obstructed by portions of the conventional accessory. As the light source is obstructed, the light emitted by the light source can also be obstructed, which can prevent the user of the electronic device from receiving the visual notifications of an incoming message. In other words, when the electronic device resides in a conventional accessory, visual notifications emitted from the light source may not be visible. As the visual notifications may not be visible through the accessory, a user can miss incoming messages or can fail to receive a contemporaneous notification of the incoming message when it is received by the electronic device residing in the accessory.

A light-collecting accessory for an electronic device is described and illustrated in the present disclosure. The light-collecting accessory disclosed herein can redirect light emitted from an electronic device residing in the accessory to an outer surface of the light-collecting accessory, thereby permitting visual notifications emitted from the electronic device to be visible at the outer surface of the light-collecting accessory.

A light-collecting accessory for an electronic device includes a housing having an outer surface and an inner surface. The housing can form an opening adapted to receive the electronic device. A light guide is communicatively coupled to the housing. The light guide can have a first end and a second end. The first end can be communicatively coupled to the outer surface of the housing. The second end can be communicatively coupled to the inner surface of the housing. In the event the electronic device resides in the opening of the housing, light emitted from the electronic device passes from the second end of the light guide to the first end of the light guide.

Other configurations and arrangements will be described below in relation to illustrated implementations. One of ordinary skill would appreciate that the elements from the illustrated implementations can be optionally included, combined, omitted, and arranged in various combinations to achieve the described benefits of the presently disclosed light-collecting accessory for an electronic device.

Figure 1:
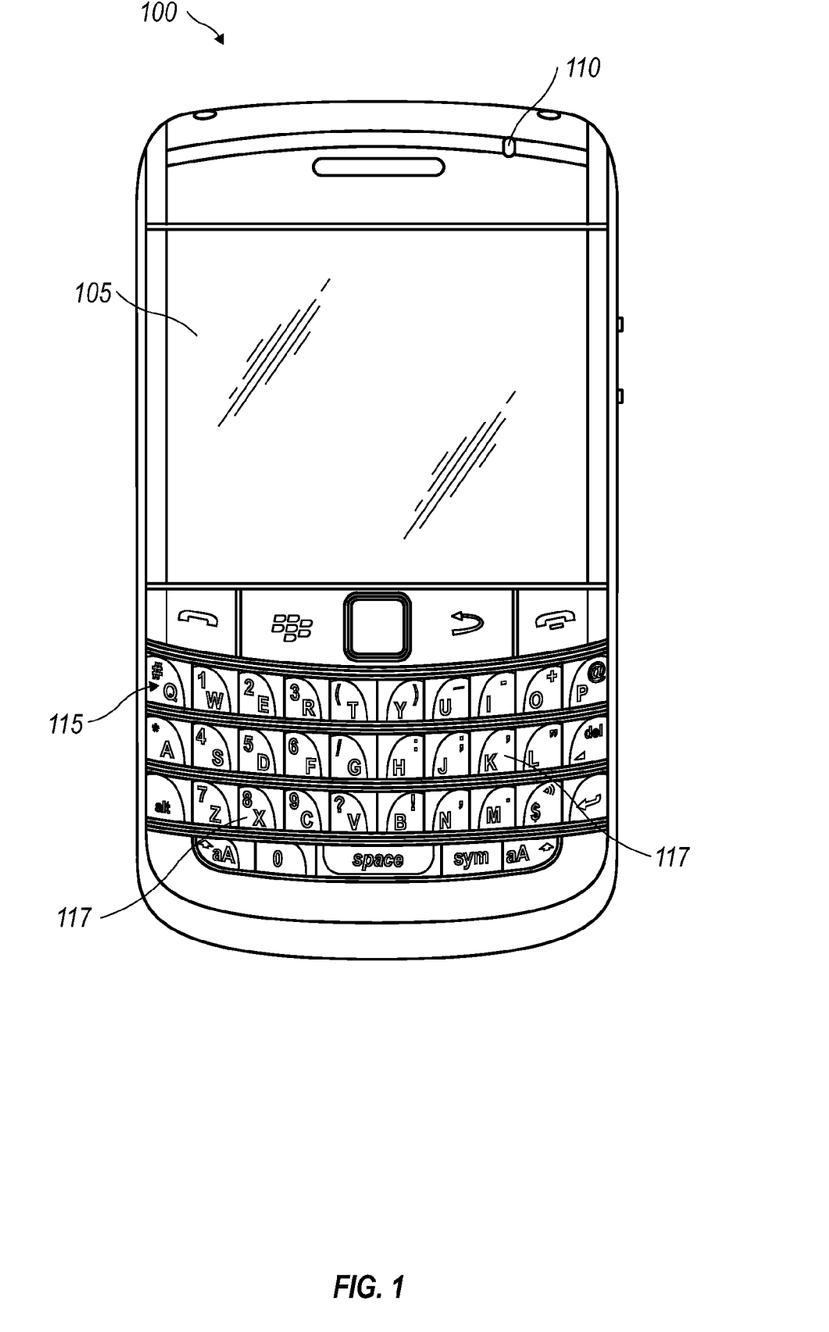
FIG. 1 is a perspective view of an exemplary electronic device receivable in a light-collecting accessory in accordance with the present technology.

FIG. 1 is a perspective view of the front of an exemplary electronic device 100 that can reside in a light-collecting accessory of the present disclosure. While the components of FIG. 1 are not all inclusive, FIG. 1 illustrates components that can be included on an electronic device 100 for a light-collecting accessory according to the present disclosure. Additional components are required to allow the mobile device 100 to function, but have been omitted for brevity and clarity. FIG. 1 illustrates an electronic device 100 that is a mobile phone. However, those of ordinary skill in the art will appreciate that the electronic device 100 can also be an electronic pad, a portable computing device, a personal digital assistant, a mobile navigation device, or other electronic device that can emit light.

The illustrated electronic device 100 has a plurality of light sources. In FIG. 1, the light sources include, for example, a display screen 105, an indicator light 110, and a keyboard 115. The display screen 105 can be a light crystal display (LCD), a light-emitting diode (LED) display, an active matrix organic light-emitting diode (AMOLED) display, a plasma display, or other display screen which can emit light and display visual information thereon. The indicator light 110 can be a light-emitting diode, a plurality of light-emitting diodes, and organize light-emitting diode, a quantum dot, an electron stimulated luminescence (ESL) lamp, a cathode ray tube, an electroluminescent wire, a solid state lighting element, or other light-emitting element which can provide visual notifications (for example, a blinking light, a flashing light, a light that can vary in brightness, or other visible notifications utilizing light). The keyboard 115 can be an illuminable keyboard 115 comprising a plurality of illuminable keys 117. The keyboard 115 can be a full keyboard 115, having twenty-six keys 117 each associated with an alphabetic indicia, as illustrated in FIG. 1. Alternatively, the keyboard 115 can be a reduced keyboard, where at least one key 117 is associated with more than one alphabetic indicia. The keys 117 can be illuminable press-actuable keys, illuminable touch-sensitive keys, illuminable capacitive keys, or other similar illuminable key that allows for the input of data to a processor of the electronic device 100 upon user-engagement with the key 117. While FIG. 1 illustrates three light sources 105, 110, 115, those of ordinary skill in the art will appreciate that the electronic device 100 can include fewer or more light sources than as illustrates, so long as the electronic device 100 includes at least one light source adapted to emit light when communicatively coupled to the electronic device 100. Those of skill in the art will also appreciate that light sources other than a display 105, an indicator light 110, and an illuminable keyboard 115 can be implemented. For example, other light sources can include an illuminable navigation tool, an illuminable function key, or other light source which can be communicatively coupled to the electronic device 100 and emit light.

The light source 105, 110, 115 can emit light to provide a user with visual notifications. The visual notifications can be indicative of an incoming message received by the electronic device 100. For example, the incoming message can be an email, a text message, a voice call, an instant message, a meeting notification, an alarm, an alarm clock, or any other message which the user of the electronic device 100 can be made aware of by a visual notification.

Figure 2:
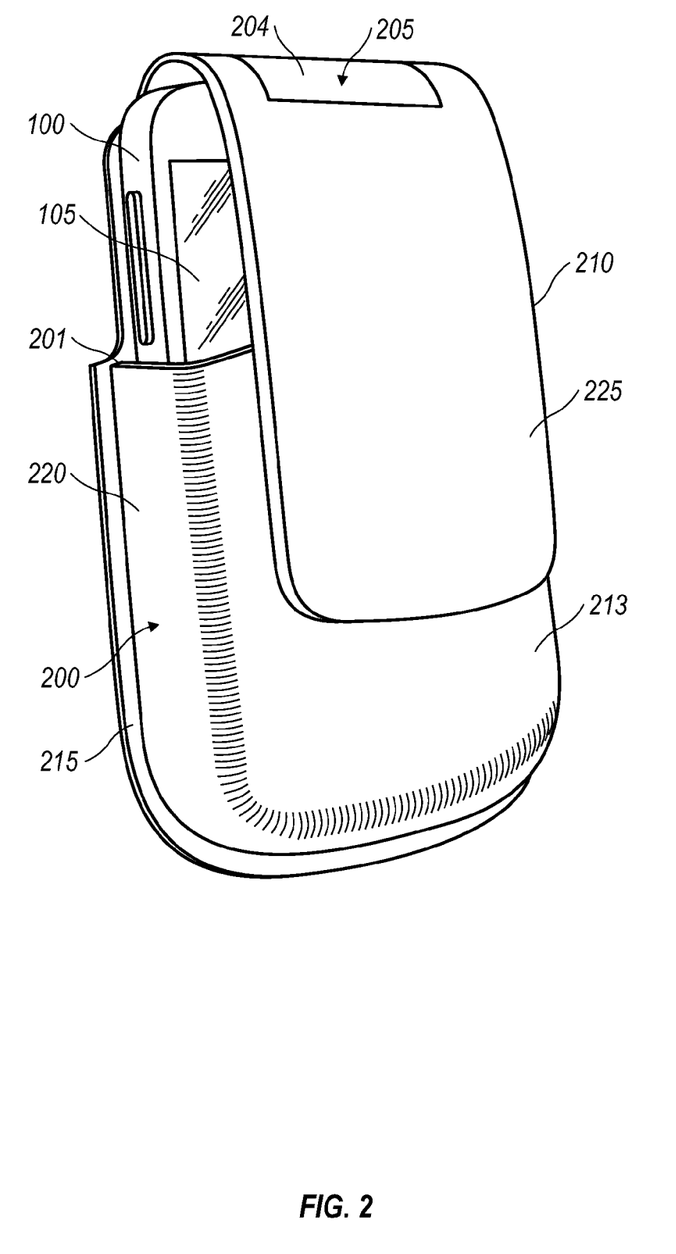
FIG. 2 is a perspective view of an exemplary electronic device received in a light-collecting accessory in accordance with an exemplary implementation of the present technology.
Figure 3:
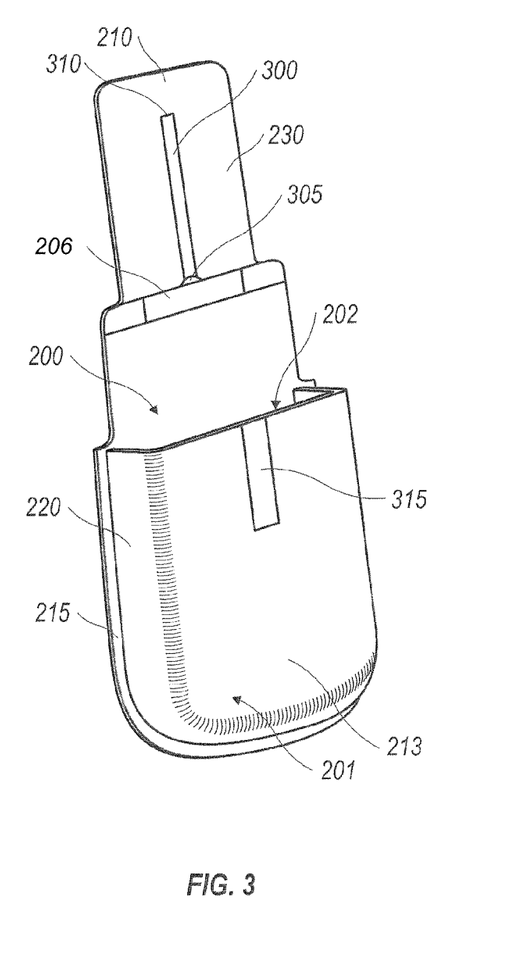
FIG. 3 is a perspective view of a light-collecting accessory in accordance with an exemplary implementation of the present technology, showing a portion of the inner surfaces of the light-collecting accessory.

FIG. 2 illustrates an exemplary light-collecting accessory 200 having an electronic device 100 residing therein. FIG. 3 illustrates the light-collecting accessory 200 depicted in FIG. 2 in an open configuration with the electronic device 100 removed from the light-collecting accessory 200. As illustrated in FIGS. 2 and 3, the light-collecting accessory 200 includes a housing 201. The housing 201 forms an opening 202 adapted to receive the electronic device 100. For example, as illustrated in FIGS. 2 and 3, the opening 202 can be a pocket formed in the housing. In the particular implementation illustrated in FIGS. 2 and 3, the housing 201 includes a first panel 210 (for example a flap), a second panel 213 (for example a front of the opening), a side panel 220, and a back panel 215. However, those of ordinary skill in the art will appreciate that the housing 201 can have fewer or more panels than as illustrated. Additionally, the panels 210, 213, 220, 215 can be integrated to form a uniform housing 201, for example a seamless packet, or a seamless holster.

FIG. 2 illustrates an outer surface 225 of the housing 201. The outer surface 225 can be the exposed surface of the housing 201. FIG. 3 illustrates the inner surface 230 of the housing 201. The inner surface 230 can face the electronic device 100 in the event the electronic device 100 resides in the housing 201.

A light guide 205 can be communicatively coupled to the housing 201, as illustrated in FIGS. 2 and 3. The light guide 205 can be a light collecting film, a substrate comprising a plurality of microprisms, an optical fiber, a plurality of optical fibers, or any other component which can collect light. The light guide 205 can comprise light-permeable material. For example, light-permeable material can be a plastic material, a polyethylene terephthalate (PET) film, a polyester film, a semi-transparent film, or a substantially transparent film.

In at least one implementation, such as illustrated in FIG. 2, the light guide 205 is communicatively coupled to the outer surface 225 of the housing 201. In the particular implementation in FIG. 2, the light guide 210 is communicatively coupled to the first panel 210 such that the light guide 205 is exposed at the outer surface 225. In at least one implementation, the light guide 205 comprises a first end 204 (shown in FIG. 2) and a second end 206 (shown in FIG. 3). For example, the first end 204 can be the exterior surface of the light guide 205, and the second end 206 can be the interior surface of the light guide 205. The first end 204 can be communicatively coupled to the outer surface 225 of the housing 201. The second end 206 can be communicatively coupled to the inner surface 230 of the housing 201. The light guide 205 is communicatively coupled to the housing 201 such that in the event the electronic device 100 resides in the opening 202, light emitted from the electronic device 100 passes from the second end 206 to the first end 204 of the light guide 205. In other words, the second end of 206 of the light guide 205 is communicatively coupled to the housing 201 such that the second end 206 can collect light emitted from the electronic device 100 (for example form a light source 105, 110, 115).

Figure 4:
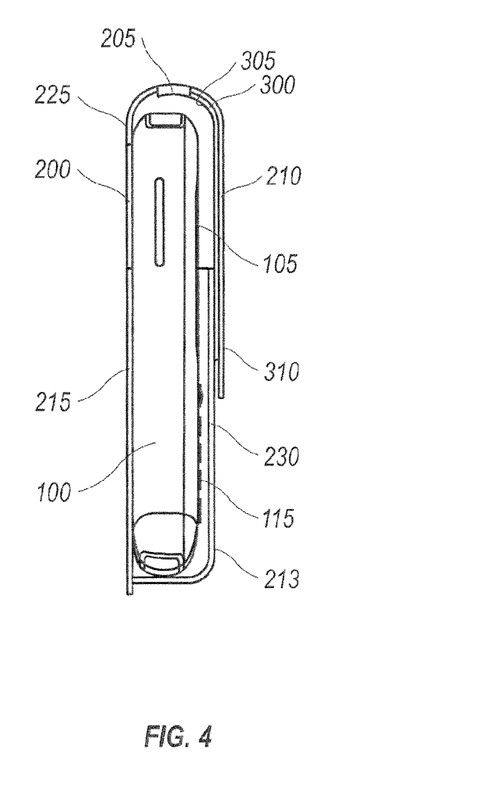
FIG. 4 is a side view of an electronic device received in a light-collecting accessory in accordance with an exemplary implementation of the present technology, wherein a side panel of the light-collecting accessory has been cutaway.

For example, in the illustrated implementation of FIGS. 2 and 3, the second end 206 of the light guide 205 is communicatively coupled to the display 105 of the electronic device 100. For example, the second end 206 can be communicatively coupled to the light source 105, 110, 115 by a light guide channel 300 as illustrated in FIGS. 3 and 4. The light guide channel 300 can be a light collecting film, a substrate comprising a plurality of microprisms, an optical fiber, a plurality of optical fibers, or any other component which can collect light. The light guide 205 can comprise light-permeable material. For example, light-permeable material can be a plastic material, a polyethylene terephthalate (PET) film, a polyester film, a semi-transparent film, or a substantially transparent film. As illustrated in FIG. 3, the light guide channel 300 is communicatively coupled to the inner surface 230 of the housing 201. In the illustrated implementation, the light guide channel 300 can include a first end 305 communicatively coupled the light guide 205 (for example the second end 206 of the light guide 205). The light guide channel 300 can also include a second end 310 adapted to align with a light source 105, 110, 115 of an electronic device 100 in the event the electronic device 100 is received in the housing 200. As the second end 310 is adapted to align with the light source 105, 110, 115, the light guide channel 300 is adapted to direct light emitted from the light source 105, 110, 115 to the light guide 205.

As the light guide channel 300 communicatively couples the light guide 205, which is exposed at the outer surface 225 of the housing 200, to the light source 105, 110, 115 of the electronic device 100 in the event the electronic device resides in the housing 200, the light guide 205 can be communicatively coupled on a panel 210, 220, 215, of the housing different from the panel 230 having an inner surface 300 that faces the light source 105, 110, 115 when the electronic device 100 resides in the housing 200.

For example, in the particular implementation illustrated in FIGS. 2-4, the light guide 205 is integrated into the first panel 210 of the housing, and the panel 213 having an inner surface facing the light source 105, 110, 115 is in a plane different from the plane having the first panel 210. The light guide channel 300 is communicatively coupled to the inner surface 230 of the first panel 210 and is adapted to couple the light guide 205 and the light source 105, 110, 115 of the electronic device 100 received in the accessory 200. Additionally, in FIG. 3, the panel 213 having an inner surface that will face the light source 105, 110, 15 in the event the electronic device 100 is received in the accessory, includes an aperture 315 defined in the panel 213. The aperture 315 is oriented to align with at least a portion of the second end 310 of the light guide channel 300. For example, the aperture 315 illustrated in FIG. 3 is shaped to correspond to and align with the light guide channel 300, when the first panel 210 is positioned substantially parallel to the panel 213, thereby placing the accessory 200 in a closed configuration. As the aperture 315 is adapted to align with the light guide channel 300, the second end 310 of the light guide channel 300 can be exposed to and align with the light source 105, 110, 115 of the electronic device 100 in the event the electronic device resides in the housing 200.

While FIG. 3 illustrates an aperture 315 adapted to align with at least a portion of the second end 310 of the light guide channel 300, a second light guide channel could be communicatively coupled to the panel 213. In such an implementation, the second light guide channel can be communicatively coupled to the panel 213 and shaped similar to the aperture 315 illustrated in FIG. 3. The second light guide channel can further be adapted to collect light from the light source 105, 110, 115 of the electronic device 100. The second light guide channel can also be communicatively coupled to the second end 310 of the first light guide channel 300 in the closed configuration (in which the first panel 210 is positioned exteriorly to the panel 213 such that the first panel 210 is substantially parallel with the panel 213). Thus, when an electronic device 100 is received in the accessory 100, light emitted from the electronic device 100 passes to the second light guide channel. The light can then pass from the second light guide channel to the second end 310 of the light guide channel 300. The light then passes from the second end 310 of the light guide channel to the second end 206 of the light guide 205. Light then passes from the second end 206 of the light guide 205 to the first end 204 of the light guide 205, which is exposed at the outer surface 225 of the housing, thereby permitting light emitted by the electronic device 100, residing in the opening 202 of the accessory 200 to be visible to a user.

FIG. 4 further illustrates the orientation of the light guide 205, light guide channel 300, and a light source 105 of an electronic device 100 residing in the accessory, in accordance with an exemplary implementation of the present technology. In FIG. 4, an electronic device 200 resides in the housing 201 of the accessory 200. The inner surface 230 of the first panel 210 and the second panel 213 face the light sources 105, 115 of the electronic device 100. As illustrated in FIG. 4, the second end 310 of the light guide channel 300 is oriented to align with the light source 105 of the electronic device 100. The first end 305 of the light guide channel 300 is communicatively coupled to the light guide 305 which is exposed at the outer surface 225 of the accessory 200. Thus, in FIG. 4, light emitted from the light source 105 passes to the light guide channel 300 to the light guide 205, thereby making the light visible at the outer surface 225 of the accessory 200.

While FIG. 4 illustrates the light guide channel 300 communicatively coupled to the first panel 210 of the housing 201, the light guide channel 300 can be communicatively coupled to other portions of the housing 201, so long as the light guide channel 300 communicatively couples the light guide 205 to the inner surface 230 of the housing 201 such that light emitted from a light source 105, 110, 115 of an electronic device 100 can pass through the light guide channel 300 to the light guide 205. For example, the light guide channel 300 can be communicatively coupled to the inner surface 230 of the front panel 213 and the back panel 215. In other words, the second end 310 light guide channel 300 can be coupled to the inner surface 230 of the front panel 213, and the first end 305 of the light guide channel 300 can be coupled to the second end 206 of the light guide 205, where the intermediate portion of the light guide channel 300 between the first end 305 and the second end 310 are traverse the front panel 213 and the back panel 215. In other implementations, the light guide 205 can be communicatively coupled a panel 213, 215, 220 different from the first panel 210, and the light guide channel 300 can be communicatively coupled to panels other than the front panel 213, so long as the light guide channel 300 can communicatively couple the light guide 205 to the inner surface 230 of the housing 201 that such that light emitted from a light source 105, 110, 115 of an electronic device 100 can pass through the light guide channel 300 to the light guide 205, in the event the electronic device 100 resides in the housing.

In FIGS. 2-4, the light guide 205 is integrated into with housing 201 such that the light guide 205 is exposed at the outer surface 225 of the housing 201. For example, an aperture can be defined in the housing 201 and the light guide 205 can be inserted into the aperture. In other implementations, the light guide 205 can be sewn, adhered, layered, affixed, or otherwise communicatively coupled to the housing 201 such that the light guide 205 is exposed at the outer surface 225 of the housing 201, whereby light emitted from the electronic device 100 can be directed to the light guide 205. Therefore, the light directed from the electronic device 100 to the light guide 205 is made visible to user, thereby allowing visual notifications emitted from the electronic device 100 to be seen from or at the accessory 200 in the event the electronic device 100 resides in the accessory 200. Although FIGS. 2 and 3 illustrate the light guide 205 communicatively coupled to a portion of a panel 210 of the housing 201, the light guide can be communicatively coupled to an entire panel 210, 220, 215, 213 of the housing 201.

Figure 5:
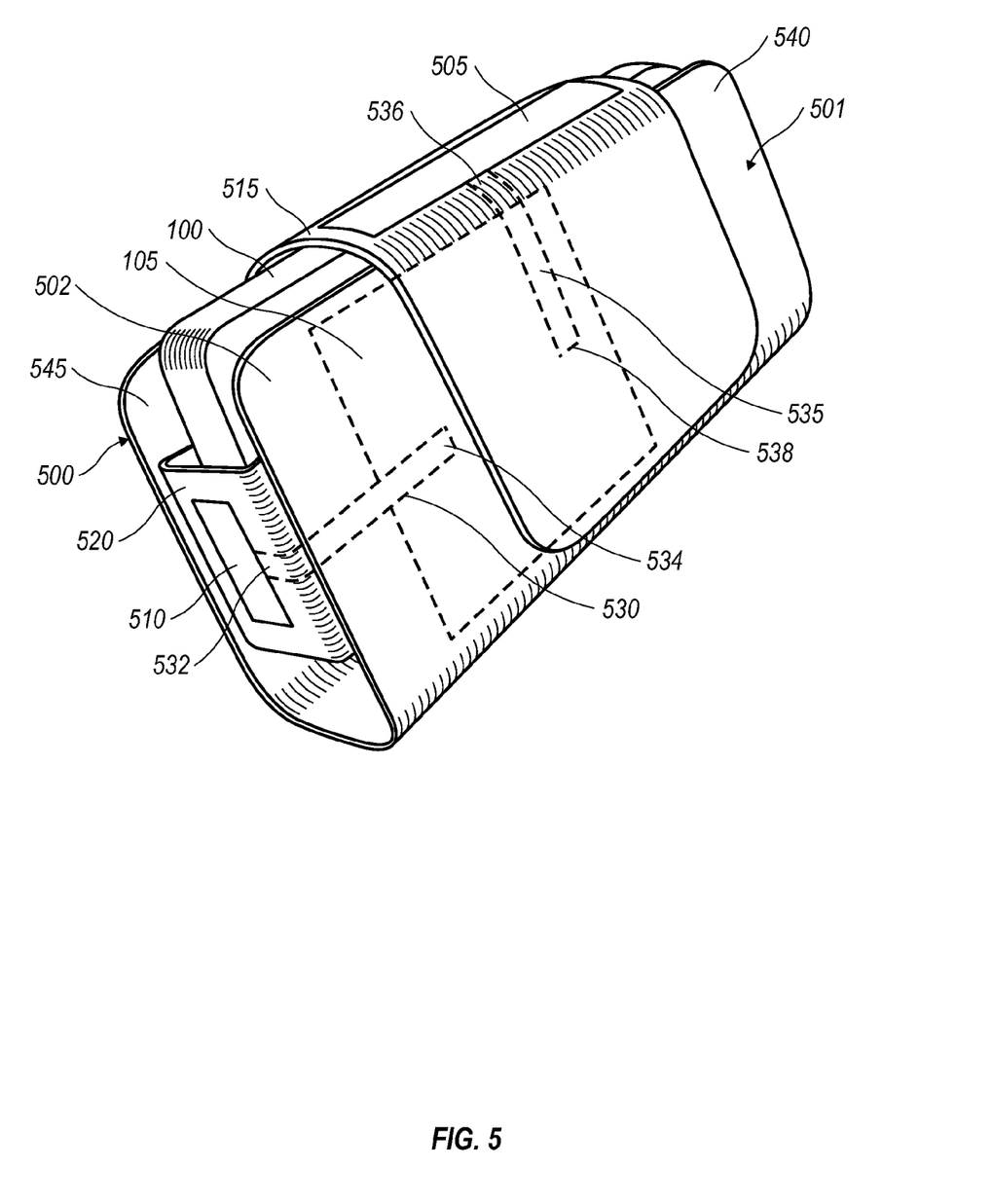
FIG. 5 is a perspective view of another light-collecting accessory in accordance with an exemplary implementation of the present technology, wherein the light-collecting accessory includes two light guides.

While the implementation of FIGS. 2-4 illustrate an accessory 200 having one light guide 205, in other implementations, the accessory 200 can have a plurality of light guides 205. For example, FIG. 5 illustrates an accessory 500 having two light guides 505, 510. More specifically, the accessory 500 illustrated in FIG. 5 includes a housing 501 having and outer surface 540 and an inner surface 545. The housing 501 also includes a first panel 515 (for example a flap), a second panel 520 (for example a side panel), and a third panel 502

(for example a front panel). A first light guide 505 is communicatively coupled to the first panel 515. The first light guide 505 includes a first end 507 and a second end (not shown). For example, the first end 507 can be the exterior surface of the light guide, and the second end can be the interior surface of the light guide. A second light guide 510 is communicatively coupled to the second panel 520 of the housing 501. Similar to the first light guide 505, the second light guide 510 can have a first end 512 and a second end (not shown).

In FIG. 5, an electronic device 100 having a light source 105 (for example, a display screen) resides in the accessory 500. The light source 105 is shown in phantom or dashed lines to indicate that the light source 105 is concealed by the third panel 502 of the housing 501 of the accessory 500. The inner surface (not shown) of the third panel 502 is oriented to face the light source 105.

In FIG. 5, a first light guide channel 535 communicatively couples the first light guide 505 to the inner surface of the third panel 502, thereby permitting light emitted from the light source 105 to pass from light guide 535 to the first light guide 505. The first light guide channel 535 is shown in phantom lines as the first light guide channel 535 is communicatively coupled to the inner surface 545 of the housing 501. More specifically, the first light guide channel 535 is communicatively coupled to the inner surface 545 of the housing. The first light guide channel 535 includes a first end 536 communicatively coupled to the second end of the first light guide 505. The first light guide channel 535 also includes a second end 538 oriented to align with the light source 105 of an electronic device 100 in the event the electronic device 100 resides in the housing 501. Similarly, a second light guide channel 530 communicatively couples the second light guide 510 to the inner surface of the third panel 502. The second light guide 530 is shown in phantom lines as the second light guide 530 is communicatively coupled to the inner surface 545 of the housing 501. The second light guide channel 530 includes a first end 532 communicatively coupled to the second end of the second light guide 510. The second light guide channel 530 also includes a second end 534 oriented to align with the light source 105 of an electronic device 100 in the event the electronic device 100 resides in the housing 501. Thus, in the event an electronic device 100 emits light, light will pass from at least one of the first light guide channel 535 and the second light guide channel 530 to the respective first light guide 505 and the second light guide 510. In other words, the light guide channels 530, 535 redirect light emitted from an electronic device 100 residing in the housing 501 of the accessory to a light guide 505, 510 exposed at the outer surface 540 of the accessory 500, thereby allowing visual notifications emitted by the light source 105 to be seen.

As the accessory illustrated in FIG. 5 includes two light guides 505, 510, the use can still view light emitted from the light source from multiple panels or sides of the housing 501. For example, if the user clips the accessory to his waistband with the first panel 515 facing upwards to him, the user will be able to receive visual notifications emitted by the light source 105 of the electronic device 100. If the user places the accessory 500 with the electronic device 100 housed in the accessory 500 in a briefcase, in a shirt pocket, on a desk or orients the accessory 500 on a surface such that the second panel 510 faces the user, the second light guide 510 allows the user to receive and view visual notifications emitted by the light source 105 of the electronic device 100. Thus, by communicatively coupling multiple light guides 505, 510 on the housing 501 of the accessory, the user can receive visual notifications from various panels of the housing 501. Also, the user can still receive visual notifications from the light guides 505, 510 even if the orientation of the accessory with respect to the user's line of vision changes.

Additionally, by the light guides 505, 510 can each be associated with a particular light source 105. For example, the first light guide 505 can be communicatively coupled to the inner surface of the 545 of the accessory housing 501 such that light emitted from the display passes from the display to the light guide 505. The second light guide 510 can be communicatively coupled to the inner surface 545 of the accessory housing 501 such that light emitted from a light source different from the display 105 associated with the first light guide 505 (for example, the illuminable keyboard or light indicator) passes from the light source to the second light guide 510. In such an implementation, a user will be able to receive visual notifications from multiple light sources of the electronic device 100 in the event the electronic device 100 resides in the accessory. While the illustrated implementation of FIG. 5 shows two light guides 505, 510, those of ordinary skill in the art will appreciate that the accessory 500 can include fewer or more light guides 505, 510 than illustrated.

FIG. 5 illustrates each light guide 505, 510 having an associated light guide channel 530, 535; however, in some implementation, a light guide 505, 510 can be communicatively coupled to a plurality of light guide channels 535, 530. For example, the light guide 505 can be communicatively coupled to two light guide channels. The first light guide channel can be communicatively coupled to the second end of the light guide 505 and can be oriented on the inner surface 545 of the housing 501 such that light emitted from a first light source, for example the display 105 of an electronic device, passes from the light guide channel to the light guide 505, in the event the electronic device resides in the housing 501. A second light guide channel can also be communicatively coupled to the light guide 505 and can be oriented on the inner surface of the housing 501 such that light emitted from a second light source, for example a light indictor 115 of the electronic device, passes from the second light guide channel to the light guide 105, in the even the electronic device resides in the housing 501. Thus, in such implementations, the user can receive visual notifications emitted from multiple light sources at a light guide exposed at the outer surface 540 of the housing 501.

Figure 6:
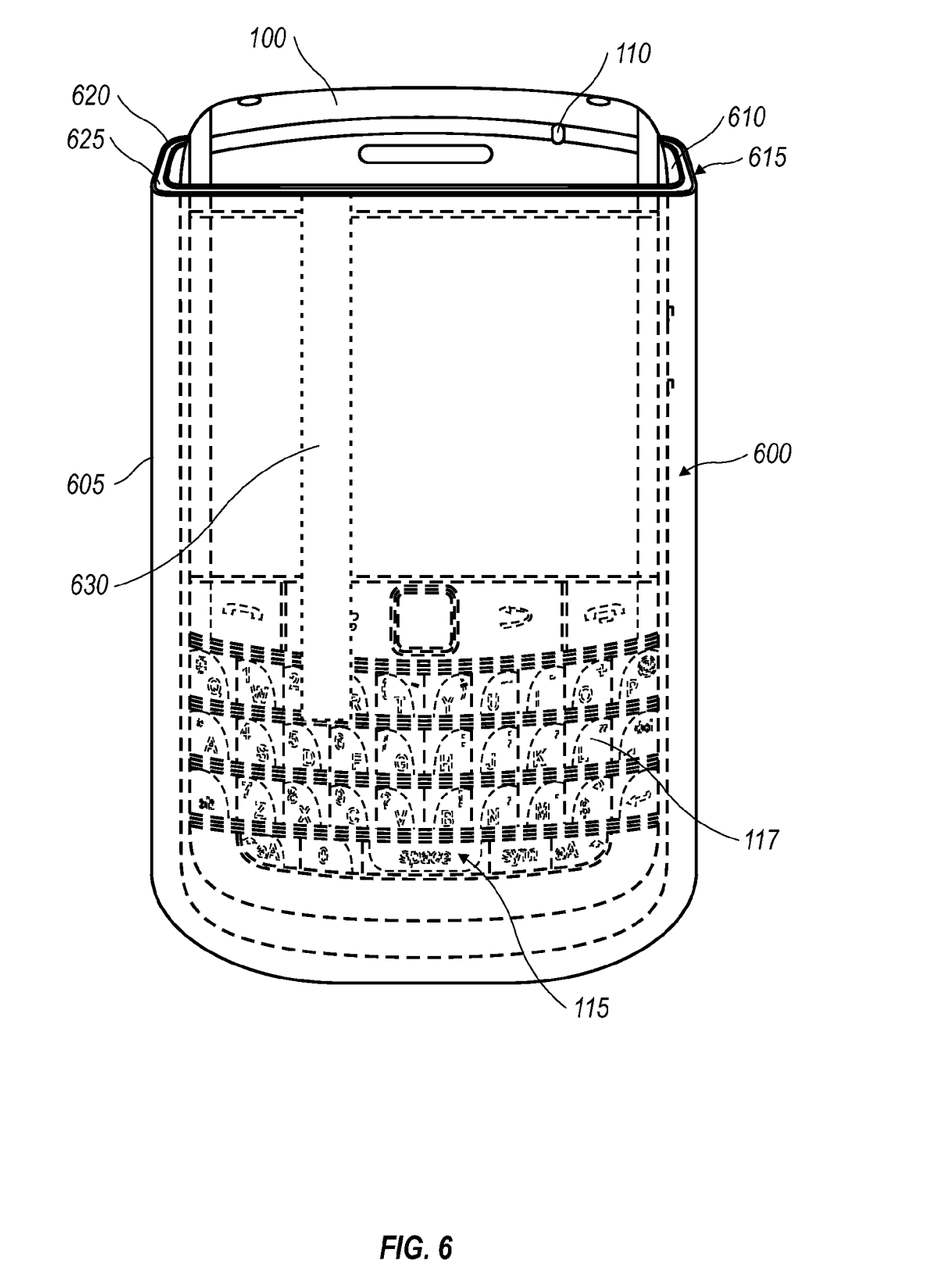
FIG. 6 is a view of the front of a light collecting-accessory in accordance with another exemplary implementation of the present technology, wherein the light collecting accessory houses an electronic device, and the arrangement of the light guides with respect to the electronic device are shown in phantom lines.

While FIGS. 2-5 illustrate an accessory 200, 500 that is a holster, those of ordinary skill in the art will appreciate that the accessory can be a pocket-type accessory, a sleeve, an electronic case or other housings for electronic device 100, for example as shown in FIG. 6. Those of skill in the art will also appreciate that the accessory 200, 500 can also be a docking station, an accessory clip, or any other accessory which can receive an electronic device 100.

FIG. 6 illustrates an accessory 600 that is a sleeve or pouch. The accessory 600 includes a housing 605 forms an opening 610 adapted to receive an electronic device 100. In FIG. 6, the opening 610 is formed at a first panel 615 or top portion of the housing 605. The first panel 615 can be perpendicular to a user's body when the accessory 600 is worn or clipped onto a user's body (for example, clipped to a user's belt). The first panel 615 can also be perpendicular to the electronic device 100 when the electronic device 100 resides in the housing 605. As illustrated in FIG. 6, the first panel 615 includes an edge 620 that forms the perimeter of the opening 610. In the implementation of FIG. 6, the accessory 600 includes a light guide 625 exposed at the edge 620. Similar to the implementations illustrated in FIGS. 2-5, the light guide 625 includes a first end exposed at the outer surface of the edge 620 and a second end that is communicatively coupled to an inner surface (not shown) of the accessory 600 and communicatively coupled to a light source 110, 115 of the electronic device 100. For example, in FIG. 6, the light guide 625 can comprise a first surface comprising the first end exposed at the edge 620 and a second surface comprising the second end coupled to the interior of the accessory 600 and oriented to be parallel to the indicator light 110. Thus, when the indicator light 110 emits light, the second end of the light guide 625 can collect the emitted light and enable the light to pass from the second end to the first end of the light guide 625. In at least one implementation, the accessory 600 can include a light guide channel 630 coupled to the second end of the light guide 625. The light guide channel 620 can direct light from another light source of the electronic device 100 (for example, the illuminable keyboard 115) to the first end of the light guide 625, thereby making visual notifications emitted by the illuminable keyboard 625 visible when the electronic device 100 resides in the accessory 600. Thus, the accessory illustrated in FIG. 6 enable light emitted from a light source of an electronic device 100 to be redirected to an exposed surface of the accessory by the light guide 625. In the particular implementation of FIG. 6, light emitted from the electronic device 100 will illuminate the edge 620 of the accessory 600, thereby informing a user of an incoming message or other visual notification emitted by the electronic device 100. While the accessory 600 illustrated in FIG. 6 includes a light guide 625 which can emit light from more than one light source 110, 115 of the electronic device 100, those of ordinary skill in the art will appreciate that the light guide 625 can be oriented and adapted to redirect light emitted form one light source. Additionally, while the accessory 600 illustrated in FIG. 6 illustrates a light guide 625 coupled to top edge 620 of the accessory, those of ordinary skill in the art will appreciate that the light guide 625 can be coupled on other surfaces and edges of the accessory 600 and can include more than one light guide and fewer or more light guide channels 630 than illustrated.

The present disclosure describes a light-collecting accessory 200, 500 for an electronic device 100. The light-collecting accessory 200, 500 includes a light guide 205, 305, 310 exposed at the outer surface 225, 540 of the accessory 200, 500. The light guide 205, 305, 310 comprises a first end exposed at the outer surface and a second end that is communicatively coupled to the inner surface 230, 545. In the event the electronic device 100 resides in the housing 201, 501 of the accessory, light emitted from the electronic device 100 passes from the second end to the first end of the light guide 20, 305, 310, thereby allowing visual notifications emitted by the electronic device 100 to be seen by the user, even when the accessory 200, 500 conceals or obstructs the light sources of the electronic device 100. Additionally, with the light-collecting accessory 200, 500, additional components, such as a light source, power source, or electrical interface for the accessory 200, 500 is not necessary to direct or redirect visual notifications emitted by the electronic device 100 to be seen at the accessory 200, 500.

Exemplary implementations have been described hereinabove regarding an electronic device having a concealed keyboard However, one of ordinary skill in the art will appreciate that the concealed keyboard can be implemented on other devices, such as handheld computing devices, PDAs, cellphones, or other mobile devices utilizing keyboard, keypads, or switch panels to input data to the mobile device. One of ordinary skill in the art will also appreciate that the elements and features illustrated in the implementations described and illustrated in the figures herein can be optionally included to achieve the benefits of the presently disclosed electronic device having a concealed keyboard. Additionally, those skilled in the art will appreciate that features in each of he figured described herein can be combined with one another and arrange to achieve the described benefits of the presently disclosed electronic device having a concealed keyboard. Various modifications to and departures from the disclosed implementations will occur to those having skill in the art. The subject matter that is intended to be within the spirit of this disclosure is set forth in the following claims.

What is claimed is:

1. An accessory for an electronic device having a display, the accessory comprising:
    a housing that receives the electronic device through an opening, the housing including a first panel that conceals the display;
    a light guide channel provided on an inner surface of the first panel, the light guide channel having a first end and a second end, the first end being substantially aligned with the display; and
    a light guide that is communicatively coupled to an outer surface of the housing, the light guide being communicatively coupled to the second end of the light guide channel such that light rays emitted from the display are guided through the light guide channel to the light guide.

2. The accessory of claim 1, wherein the housing includes a second panel that conceals one of a keyboard that is configured to illuminate and a light emitting diode, the accessory further comprising:
    a second light guide channel provided on an inner surface of the second panel, the second light guide channel having a first end and a second end, the first end being substantially aligned with the corresponding one of the keyboard and the light emitting diode; and
    a second light guide that is communicatively coupled to the outer surface of the housing, the second light guide being communicatively coupled to the second end of the second light guide channel such that light rays emitted from the corresponding one of the keyboard and the light emitting diode are guided through the second light guide channel to the second light guide.

3. The accessory of claim 1, wherein the light guide is at least one of a light collecting film, a substrate comprising a plurality of microprisms, and an optical fiber.

4. The accessory of claim 1, wherein the light guide comprises light-permeable material.

5. The accessory of claim 4, wherein the light permeable material is one of a plastic material, a polyethylene terephthalate film, a polyester film, and a semi-transparent film.

6. The accessory of claim 1, further comprising an aperture is defined in the first panel, the aperture being aligned with the first end of the light guide channel.

7. The accessory of claim 1, wherein the light guide is integrated into the housing such that the light guide is exposed at the outer surface of the housing.

8. The accessory of claim 1, wherein the light guide channel comprises at least one of a light collecting film, a substrate comprising a plurality of microprisms, and an optical fiber.

9. The accessory of claim 8, wherein the at least one of the light collecting film, the substrate comprising the plurality of microprisms, and the optical fiber is adapted to collect light rays emitted from the display, the light guide channel being configured to direct the collected light to the light guide.

10. The accessory of claim 2, wherein the housing includes a third panel that conceals the other of the keyboard and the light emitting diode, the accessory further comprising:
    a third light guide channel provided on an inner surface of the third panel, the third light guide channel having a first end and a second end, the first end being substantially aligned with the corresponding one of the keyboard and the light emitting diode; and a third light guide that is communicatively coupled to the router surface of the housing, the third light guide being communicatively coupled to the second end of the third light guide channel such that light rays emitted from the corresponding one of the keyboard and the light emitting diode are guided through the third light guide channel to the third light guide.

11. The accessory of claim 1, wherein the housing includes a plurality of panels that collectively conceal the electronic device, the accessory further comprises a light guide channel provided on an inner surface of at least two panels, each of the light guide channels having a first end and a second end, each of the first ends being substantially aligned with the display.

12. The accessory of claim 11, further comprising:
a first light guide;
a second light guide, the first light guide and the second light guide being communicatively coupled to a corresponding outer surface of the two panels of the housing, the first light guide being communicatively coupled to one of the second ends,
the second light guide being communicatively coupled to the other of the second ends such that light rays emitted from display are guided through the corresponding light guide channel to the respective light guide.

13. An accessory for an electronic device having a keyboard that is configured to illuminate, the accessory comprising:
a housing that receives the electronic device through an opening, the housing including a first panel that conceals the keyboard;
a light guide channel provided on an inner surface of the first panel, the light guide channel having a first end and a second end, the first end being substantially aligned with the keyboard; and
a light guide exposed at a portion of an outer surface of the housing, the light guide being communicatively coupled to the second end of the light guide channel such that light rays emitted from the keyboard are guided through the light guide channel to the light guide.

14. The accessory of claim 13, wherein the housing includes a second panel that conceals one of a display and a light emitting diode, the accessory further comprising:
a second light guide channel provided on an inner surface of the second panel, the second light guide channel having a first end and a second end, the first end being substantially aligned with the corresponding one of the display and the light emitting diode; and
a second light guide that is communicatively coupled to the outer surface of the housing, the second light guide being communicatively coupled to the second end of the second light guide channel such that light rays emitted from the corresponding one of the display and the light emitting diode are guided through the second light guide channel to the second light guide.

15. The accessory of claim 13, wherein the light guide comprises:
an exterior surface exposed at the outer surface of the housing; and
a plurality of microprisms adapted to collect light rays emitted from the keyboard, the light guide channel being configured to direct the collected light to the exterior surface.

16. The accessory of claim 13, further comprising an aperture is defined in the first panel, the aperture being aligned with the first end of the light guide channel.

17. A sleeve for an electronic device having a display and a keyboard that is configured to illuminate, the sleeve comprising:
a housing configured to receive the electronic device, the housing comprising a first panel that conceals the display and the keyboard;
a light guide channel provided on an inner surface of the first panel, the light guide channel having a first end and a second end, the first end being substantially aligned with the display and the keyboard; and
a light guide provided at an edge of the first panel, the light guide being communicatively coupled to the second end of the light guide channel such that light rays emitted from at least one of the display and keyboard are guided through the light guide channel to the light guide.

18. The sleeve of claim 17 wherein the light guide is at least one of a light collecting film, a substrate comprising a plurality of microprisms, and an optical fiber.

19. The sleeve of claim 17, wherein the light guide comprises light-permeable material.

20. The sleeve of claim 19, wherein the light permeable material is one of a plastic material, a polyethylene terephthalate film, a polyester film, and a semi-transparent film.

* * * * *